(12) United States Patent
Hartman (10) Patent No.: US 9,730,395 B2
(45) Date of Patent: Aug. 15, 2017

(54) MODULAR GROWING PANEL SYSTEM AND METHOD FOR COVERING STRUCTURES WITH VEGETATION

(76) Inventor: Gary R. Hartman, Hollister, CA (US)

( * ) Notice: Subject to any disclaimer, the term of this patent is extended or adjusted under 35 U.S.C. 154(b) by 74 days.

(21) Appl. No.: 13/179,523

(22) Filed: Jul. 9, 2011

(65) Prior Publication Data

US 2012/0005954 A1 Jan. 12, 2012

Related U.S. Application Data

(60) Provisional application No. 61/363,053, filed on Jul. 9, 2010.

(51) Int. Cl.
*A01G 9/02* (2006.01)

(52) U.S. Cl.
CPC ............ *A01G 9/025* (2013.01); *Y02P 60/244* (2015.11)

(58) Field of Classification Search
CPC .............................. A01G 9/025; Y02P 60/244
USPC ........................................... 47/65.9, 86, 59 S
See application file for complete search history.

(56) References Cited

U.S. PATENT DOCUMENTS

| | | | | |
|---|---|---|---|---|
| 2,279,735 A | * | 4/1942 | Gates ................................. | 47/33 |
| 3,899,850 A | * | 8/1975 | Gluck et al. ...................... | 47/74 |
| 4,434,576 A | * | 3/1984 | Sowerwine ........................ | 47/39 |
| 6,606,823 B1 | * | 8/2003 | McDonough et al. ........ | 47/65.9 |
| 6,711,851 B2 | * | 3/2004 | Mischo .......................... | 47/65.9 |
| 7,868,057 B2 | * | 1/2011 | Park ............................... | 523/123 |
| 2005/0178056 A1 | * | 8/2005 | Morrone ............................ | 47/9 |
| 2008/0035217 A1 | * | 2/2008 | Hartman et al. ............. | 137/560 |
| 2008/0110086 A1 | * | 5/2008 | Julia ................................. | 47/64 |
| 2009/0019765 A1 | * | 1/2009 | Kosinski et al. ................. | 47/64 |
| 2011/0005130 A1 | * | 1/2011 | Huang et al. .................. | 47/65.7 |

FOREIGN PATENT DOCUMENTS

| | | | |
|---|---|---|---|
| FR | 2902602 A1 | * | 12/2007 |
| GB | 2458904 A | * | 10/2009 |
| WO | WO 2008146131 A2 | * | 12/2008 |

* cited by examiner

*Primary Examiner* — Joshua Huson
(74) *Attorney, Agent, or Firm* — Lamon Patent Services

(57) ABSTRACT

Provided is a modular growing panel system for attaching vegetation to a surface of a structure. In one aspect, the modular growing panel system includes a growing substrate with a plurality of layers formed into a tile that is rigid and self-supportive of vegetation being grown in the growing substrate. A binder attaches one or more of the tiles to each other and forming the modular growing panel system. In another aspect, the modular growing panel system includes a growing substrate with a plurality of layers formed into a tile that is rigid and self-supportive of vegetation being grown in the growing substrate. A framework for holding and attaching one or more tiles to the structure includes an upper channel having a slot that corresponds to the depth of the tile and a lower channel also having a slot corresponding to the depth of the tile.

9 Claims, 8 Drawing Sheets

Pair of moldings 500
upper molding 502
Side view 5-1
lower molding 504
side view 5-2
upper molding lower groove 506
upper molding upper groove 508
Structure surface 510
lower molding upper groove 512
lower molding lower groove 514

MODULAR GROWING PANEL SYSTEM AND METHOD FOR COVERING STRUCTURES WITH VEGETATION

CROSS-REFERENCE TO RELATED APPLICATIONS

This application claims priority to U.S. Prov. Ser. No. 61/363,053 filed Jul. 9, 2010 which is assigned to the as assignee of the present invention and incorporated by reference herein for all purposes. The subject matter of this provisional patent specification further relates to the subject matter of the following commonly assigned U.S. patent application Ser. No. 11/776,105 filed Jul. 11, 2007 entitled, "Method and Apparatus for Controlled Mixing of a Dry Material with a Binder" that relies upon U.S. Provisional Patent Application Ser. No. 60/837,674 entitled, "Method and Apparatus for Mixing Dry Materials with Binders", filed Aug. 14, 2006. Each of the above-referenced patent applications is incorporated by reference herein for all purposes. The above-referenced patent applications are collectively referenced herein below as "the commonly assigned incorporated applications."

TECHNICAL FIELD

This patent specification relates to methods and systems for covering roofs, walls and other surfaces of structures with vegetation. More particularly, this patent specification relates to methods and systems for covering roofs, walls and other surfaces of buildings with vegetation in a manner that resists erosion and damage caused through exposure to weather while promoting longevity and resiliency of the vegetation.

BACKGROUND

Global efforts in conserving energy and reducing the human impact on the environment has energized interest in so-called "green technologies". A good portion of these technologies focus on reducing energy consumption at home and work as this is where the largest concentration of energy usage takes place. As a reflection of this movement, numerous cities and municipalities are adopting new building codes that incentivize adoption of energy conserving technologies and building methods. Building certifications such as provided by LEED (Leadership in Energy & Environmental Design) may not only result in certain energy savings benefits but may also provide for certain tax credits and benefits.

Covering roofs, walls and other surfaces of a building in vegetation saves energy and qualifies for LEED certification credits. Natural vegetative coverage placed on a roof or a wall increases insulation as well as limits the effects of storm water runoff. Plants and other vegetation covering the walls or roofs absorb water that would otherwise fill storm drains in the area. Instead of seasonal flooding, storm water may be stored in the soil and vegetation.

Despite this interest and apparent benefits, it remains difficult to design a vegetative coverage system that adequately covers the wall or the roof of a building or structure. In the face of inclement weather, many conventional "green roof" systems such as that described in U.S. Pat. No. 7,900,397 by Mischo, entitled "Modular Green Roof Systems, Apparatus and Methods" may quickly fail. In Mischo, soil and plants placed in trays on the roof of a building may be lost to strong winds and rain. The increased maintenance and costs associated with green roofing systems like Mischo makes the installation of green roof systems undesirable. Moreover, the trays used to hold the plants and soil in Mischo cannot be mounted vertically on a wall or a reasonable angle without quickly leaking soil and other materials.

SUMMARY

Aspects of the present invention include a modular growing panel system for attaching vegetation to a surface of a structure. In one aspects, the modular growing panel system includes a growing substrate with a plurality of layers formed into a tile that is rigid and self-supportive of vegetation being grown in the growing substrate and a binder attaching one or more of the tiles to each other and forming the modular growing panel system. In another aspect, the modular growing panel system includes a growing substrate with a plurality of layers formed into a tile that is rigid and self-supportive of vegetation being grown in the growing substrate and a framework for holding and attaching one or more tiles to the structure created from a upper channel and having a slot that corresponds to the depth of the tile and a lower channel and having a slot corresponding to the depth of the tile. Yet another implementation of the modular growing panel system includes a growing substrate with a plurality of layers formed into a tile that is rigid and self-supportive of vegetation being grown in the growing substrate, a framework for holding and attaching one or more tiles to the structure created from a upper channel with an upper flange and having a slot that corresponds to the depth of the tile and a lower channel with a lower flange and having a slot corresponding to the depth of the tile; and upper molding to be affixed to the surface of the structure having a groove disposed to receive the upper flange of the upper channel of the framework and a lower molding to be affixed to the surface of the structure having groove disposed to receive the lower flange of the lower channel of the framework.

DETAILED DESCRIPTION OF THE INVENTION

In the following detailed description, for purposes of explanation, numerous specific details are set forth to provide a thorough understanding of the various embodiments of the present invention. Those of ordinary skill in the art will realize that these various embodiments of the present invention are illustrative only and are not intended to be limiting in any way. Other embodiments of the present invention will readily suggest themselves to such skilled persons having the benefit of this disclosure.

In addition, for clarity purposes, not all of the routine features of the embodiments described herein are shown or described. One of ordinary skill in the art would readily appreciate that in the development of any such actual implementation, numerous implementation-specific decisions may be required to achieve specific design objectives. These design objectives will vary from one implementation to another and from one developer to another. Moreover, it will be appreciated that such a development effort might be complex and time-consuming but would nevertheless be a routine engineering undertaking for those of ordinary skill in the art having the benefit of this disclosure.

Aspects of the present invention provide one or more of the following advantages. Instead of leaving the top soil exposed, implementations of the present invention use a growing substrate with a protective layer on top to counter the effects of erosion from wind and heavy rains. This protective layer also helps insulate the lower layers of the growing substrate from damage caused by ultra-violet radiation and heat. The growing substrate is important as it is the part of the modular growing panel system of the present invention where the vegetation grows and thrives.

Additionally, aspects of the present invention use synthetic foam to stabilize and strengthen the growing substrate. The growing substrate together with soil and nutrients together are formed into tiles that can be put together in a modular growing panel system. Nutrients and moisture trapped in the foam pockets of the growing substrate provide enhanced water retention characteristics and a fertile growing environment for the root systems of plants inserted into the substrate.

Tiles in the modular growing panel system can be easily cut out and replaced without damaging the remainder of the system. If a section of tiles become damaged, a new tile can be prepared and inserted between the existing tiles already installed. The vegetation from the new tile should not disturb the vegetation already growing in the adjacent tiles.

Modular growing panel system of the present invention is also advantageous as providing a large surface area for holding vegetation. As described later herein in detail, the tiles making up the growing panel system are rigid and need little support. As a consequence a substantial area of the weather protective layer remains uncovered and available to receive more of the starter vegetation.

Other benefits and advantages will become apparent to those skilled in the art in view of the specification and associated figures described in further detail herein below.

It is to be appreciated that while one or more implementations may be described further herein in the context of a residential home, such as single-family residential home, the scope of the present teachings is not so limited. More generally, a according to one or more of the preferred implementations are applicable for a wide variety of structures that might benefit from vegetative coverage in energy savings, aesthetics, water conservation, noise reduction and other advantages. For example, a modular growing panel system of the present invention may be used in, without limitation, duplexes, townhomes, multi-unit apartment buildings, hotels, retail stores, office buildings and industrial buildings. Further, it is to be appreciated that while the terms user, customer, installer, homeowner, occupant, contractor, gardener, guest, tenant, landlord, repair person, and the like may be used to refer to the person or persons who are installing, using, benefiting or servicing one or more implementations of the present invention described herein, these references are by no means to be considered as limiting the scope of the present teachings with respect to the person or persons who are performing such actions.

Figure 1:
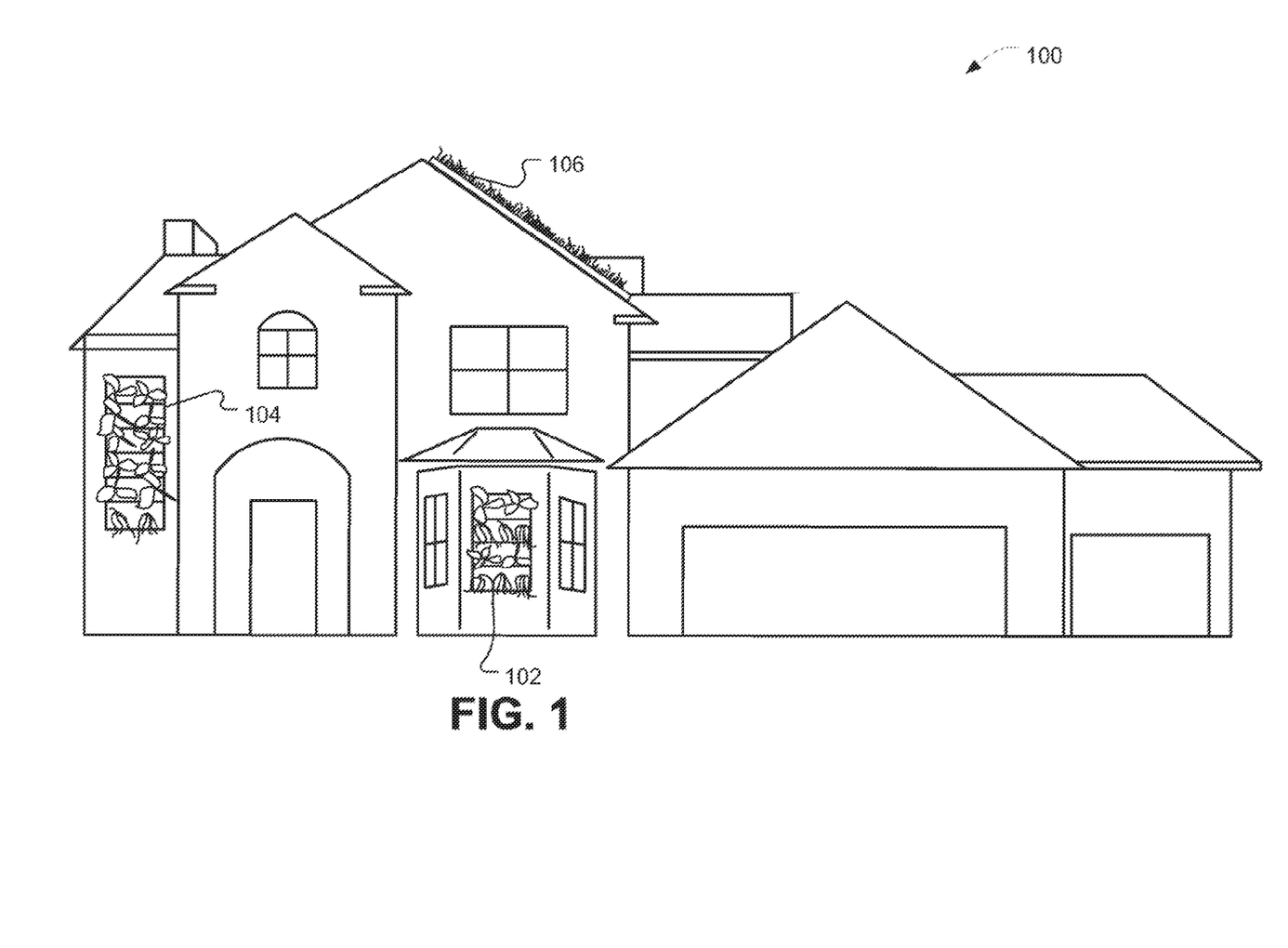
FIG. 1 is a diagram of an exemplary structure using one or more modular growing panel systems in accordance with some implementations of the present invention.

FIG. 1 is a diagram of an exemplary structure using one or more modular growing panel systems in accordance with the present invention. In this example, structure 100 is a single family residence incorporating two modular growing panel systems 102 and 104 attached to walls in a vertical and upright position. Structure 100 also includes a modular growing panel system 106 attached at an angle to the roof portion as illustrated. Because of its robust design, the same basic modular growing panel system may be installed in vertical, angled and flat positions (not shown) on various surfaces of structure 100 without significant modification or additional requirements.

Modular growing panel system 102 may have been installed in lieu of a window or other architectural detail on structure 100 for energy savings and water management. It is contemplated that modular growing panel system 102 may be installed during construction of structure 100 or afterwards as an upgrade during remodeling or landscaping. As described in further detail later herein, modular growing panel system 102 may be attached to structure 100 by a homeowner, contractor or gardener using a few basic tools and training. Preferably, pre-grown seedlings or starter plants are selected and installed in growing panel system 102 based upon environmental and geographic conditions. For example, larger leafy plants may provide a certain aesthetic appeal and desired insulation quality when installed in modular growing panel system 102. It is also contemplated that modular growing panel system 102 may be pre-seeded and delivered ready for installation and growing in certain other applications.

Modular growing panel system 104 is constructed and installed in a similar manner to modular growing panel system 102 except that it is attached to a different location and surface of structure 100. In this application, modular growing panel system 104 may serve as an accent or to add color to a large open area of structure 100. Since implementations of the present invention are modular, the dimensions of modular growing panel system 104 may be adjusted to better fit the area it occupies on structure 100. Like modular growing panel system 102, vegetation may be installed using seedlings that fit the environmental conditions and geography as well as achieve certain conservation goals of insulation and water management. For example, modular growing panel system 104 may contain a similar or the same mixture of leafy plants and vegetation since it has a similar exposure and desired aesthetic effect.

As a further example of versatility and robust design, implementations of the present invention may also be installed in an angled position for use in a roofing application. Modular growing panel system 106 is similar in construction and installation as modular growing panel system 102 and 104 except that it is installed in an area of structure 100 with different insulation and water management requirements. First, the size and shape of the modular growing panel system 106 is adjusted to fit the size and dimensions of the roof. These dimensions generally are much larger than either of modular growing panel system 102 or 104. Next, care must be taken when installing modular growing panel system 106 to insure that holes or other openings are not made to the roofing membrane or other areas that require water tight conditions. Modular growing panel system 106 may be secured to the roof area through the gravity of its own downward weight, adhesive materials or a few strategically placed anchor points as required. Next, a different type of vegetation may be installed in modular growing panel system 106 to accommodate higher insulation and greater water retention requirements. Vegetation or plants in modular growing panel system 106 may also need to withstand greater exposure to the sun, heat and ultra-violet radiation. For example, it may be desirable to install a grass or other dense plant in modular growing panel system 106 that absorb and use more water during rainfall as well as absorb and use sunlight and heat during more arid and dry conditions.

In most cases, it is contemplated that modular growing panel systems 102, 104 and 106 will also need occasional watering and moisture to thrive and grow. Accordingly, implementations of the present invention may accommodate a variety of irrigation systems including drip systems installed either overhead or subterranean. For example, one or more irrigation inlets in modular growing panel system 106 would be populated with drip irrigation pipes as required for watering dense grass vegetation during the summer and other arid time periods.

Figure 2A:
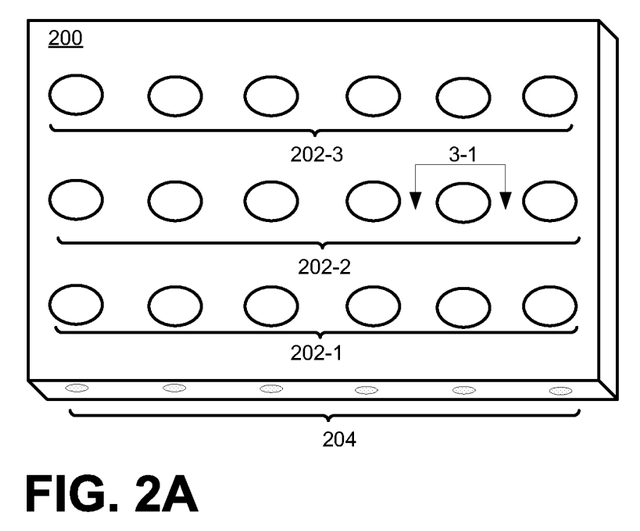
FIG. 2A includes a schematic illustration of a growing substrate having insertion areas and irrigation inlets in accordance with some implementations of the present invention.

A modular growing panel system of the present invention includes a growing substrate with a plurality of layers. The growing substrate portion is formed into a tile that is rigid and self-supportive of vegetation being grown therein. FIG. 2A includes a schematic illustration of a growing substrate 200 having insertion areas 202-1, 202-2 and 202-3 and irrigation inlets 204. In accordance with the present invention a portion of the rigidity in the tile of growing substrate 200 is created by combining earth materials and plant nutrients with a binding material, such as a synthetic foam material. The synthetic foam material stabilizes the earth materials and plant nutrients while also providing rigidity and overall support to the growing substrate 200. One particularly advantageous method and system for combining foam and earth materials in this manner is described in the commonly assigned U.S. patent application Ser. No. 11/776, 105, supra.

Holes cut into a top layer of growing substrate 200 provide vegetation access to the earth materials and nutrients. The number and size of the holes depends on the application and can be greater or fewer than the number illustrated in FIG. 2A. For example, the tile in FIG. 2A includes six (6) holes in each of insertion areas 202-1, 202-2 and 202-3 providing for a total of eighteen (18) different locations for inserting vegetation. Irrigation inlets 204 are holes formed in the tile and disposed to receive drip irrigation or other types of irrigation and provides water to the vegetation inserted into the tiles. In the implementation illustrated in FIG. 2A, irrigation inlets 204 include six (6) holes disposed to receive irrigation lines for each of the six (6) columns associated with insertion areas 202-1, 202-2 and 202-3. Preferably, growing substrate 200 is produced as a tile approximately 10" high and 20" wide and occupies a volume of approximately 1.4 cubic feet. It should be appreciated that the exact dimensions of the tile may vary and should accommodate the standard sizes found and sold by nurseries and others that might purchase, use, distribute, ship or sell implementations of the present invention.

Figure 2B:
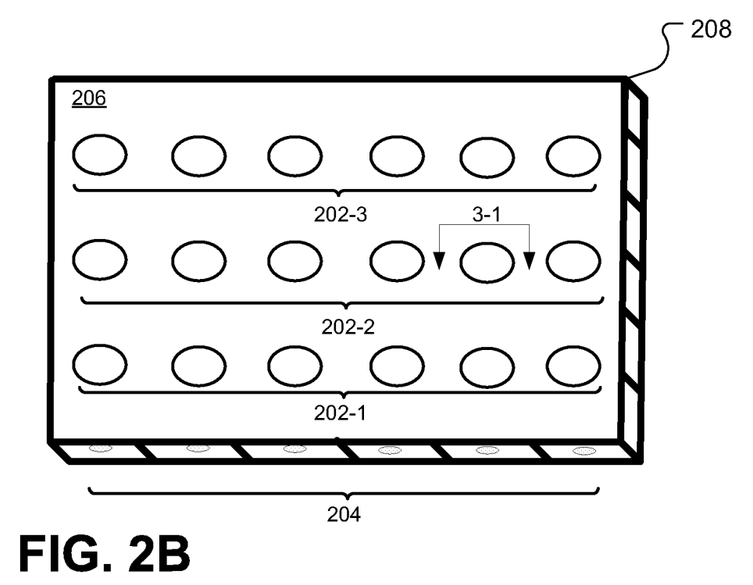
FIG. 2B illustrates a growing substrate having further increased rigidity in accordance with alternate implementations of the present invention.

FIG. 2B illustrates a growing substrate 206 in accordance with an alternate implementation of the present invention having further increased rigidity. It is contemplated that use of growing substrate 206 may be used in the same manner as growing substrate 200 as described herein and below. For example, growing substrate 206 may be specified in applications requiring a tile with more rigidity than growing substrate 200 might be able to offer. This stiffer and more rigid tile would be advantageous in areas having high winds and strong weather patterns.

Like growing substrate 200, growing substrate 206 illustrated in FIG. 2B includes a number of insertion areas 202-1, 202-1 and 202-3 along with irrigation inlets 204. The number and location of these insertion areas and irrigation inlets in growing substrate 206 also may vary depending on the application and vegetation inserted. However, to increase rigidity growing substrate 206 further includes a rigid grid 208 incorporated around and partially within growing substrate 206. In some implementations this rigid grid 208 may be formed from various types of nylon, plastic, composite materials that resist weather and bond well with the binding material, such as a synthetic foam material, used in at least one layer of the tile. Preferably, rigid grid 208 is incorporated in growing substrate 206 when the binding materials are cured causing a bond between rigid grid 208 and the mixture of foam and earthen materials. Alternatively, this rigid grid 208 may be placed around the outside of substrate 206 after the curing process and affixed with a adhesive agent or through a pressure type fitting.

Figure 2C:
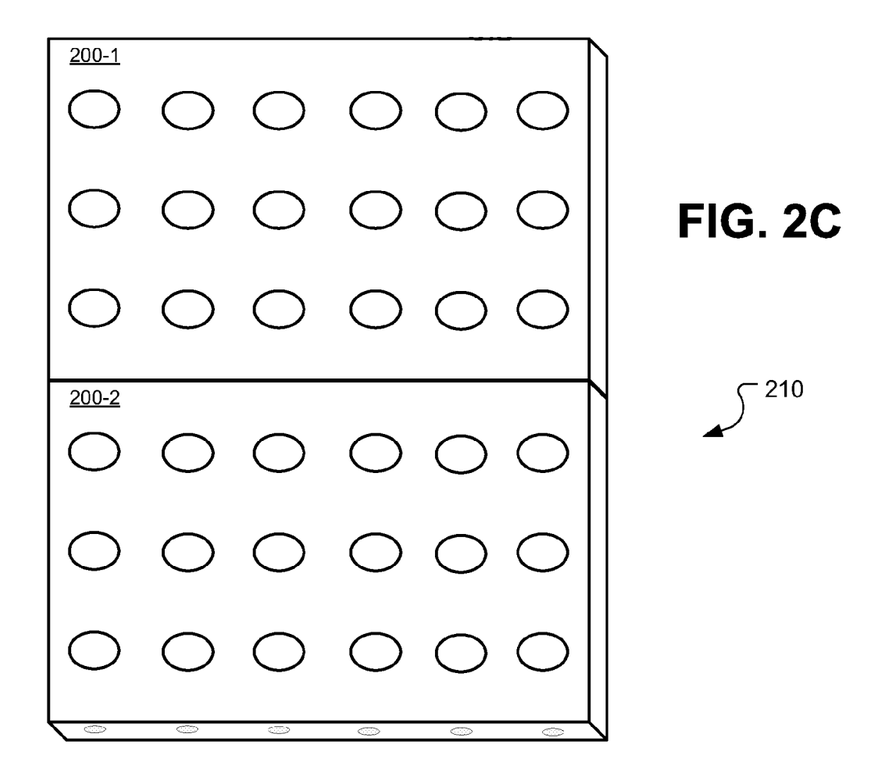
FIG. 2C is a modular growing panel system including a juxtaposition of two or more growing substrates in accordance with some implementations of the present invention.

Referring to FIG. 2C, a modular growing panel system of the present invention may include a juxtaposition of two or more growing substrates as previously described and illustrated. In this implementation illustrated in FIG. 2C, the modular growing panel system 210 includes a combination of two growing substrates 200-1 and 200-2. Each of growing substrate 200-1 and 200-1 in this example are constructed as described previously in FIG. 2A with growing substrate 200. Both of growing substrate 200-1 and 200-2 are tiles that are rigid and self-supportive of vegetation and plants being grown therein. Alternatively, modular growing panel system 210 of the present invention could also be constructed using the more rigid growing substrate 206.

Placement of two or more growing substrates together directly as illustrated in FIG. 2C might be useful on a flat roof where the weight of the growing substrates 200-1 and 200-2 tend to keep the growing panel system flat on the roof. Flat roofing systems with short parapet walls projecting above the flat roof and around the perimeter of the building may also be candidates for modular growing panel system 210 as the parapet would block or buffet the wind and other weather. As a binder between the tiles, the roots of the plants in one tile may cross over to another tile further binding growing substrate 200-1 to growing substrate 200-2. It is also contemplated that some light adhesive materials may be applied as an alternate binder between the tiles to help initially bind the tiles together and keep the modular growing panel system 210 intact. Because the tiles are rigid and need little support, a substantial area of the weather protective layer remains uncovered and available to receive a plurality of the starter vegetation.

Figure 3:
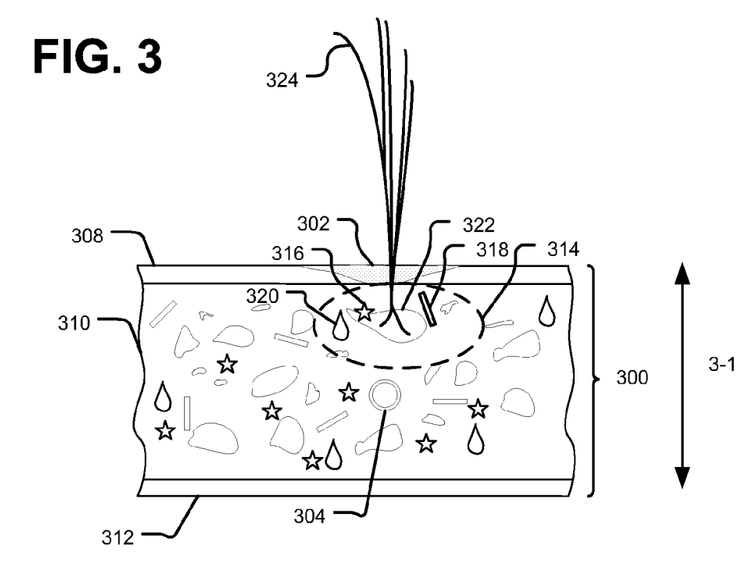
FIG. 3 illustrate a cross section of a growing substrate in accordance with some implementations of the present invention.

FIG. 3 illustrate a cross section of a growing substrate in accordance with some implementations of the present invention. Cross section 300 may represent the composition of growing substrate 200 in FIG. 2A or growing substrate 206 in FIG. 2B taken along the line 3-1 as indicated. Accordingly, cross section 300 of the growing substrate includes a protective layer 308, a growing medium layer 310 with an irrigation inlet 304 for watering and a barrier layer 312.

Protective layer 308 layer on top resists breakdown from ultra-violet (UV) radiation, acts as a weed barrier and prevents erosion due to wind and other forces while promoting moisture retention in lower layers. In some cases, the protective layer 308 may be formed from materials that allows for foot traffic and allow for the tiles of the growing substrate to be applied in steep slope conditions. It may be formed from a variety of organic materials such as coconut fibers or fibers produced from shavings of various other similar organic materials. Synthetic materials may also be used for the protective layer 308 provided the materials are not contaminated, disintegrate under ultra-violet radiation or readily dissolve in water. Optionally, an insertion area 302 in protective layer 308 may be created to receive vegetation 324 such as a starter plant and root. For example, the starter plant and root may be inserted by working a tool through the insertion area 302 in the protective layer 308 and pushing aside the organic or synthetic materials.

Growing media layer 310 lies below the protective layer 308 and provides a growing environment for the root structure of vegetation passing through the protective layer 308. As previously described, some implementations of the growing media layer 310 are formed with a homogenous mixture of earth materials and plant nutrients combined with a binder material. When the binder material cures, the result is a rigid and self-supportive tile. For example, the binding material in the growing media layer 310 may include a synthetic foam material that stabilizes the earth materials and plant nutrients while also providing rigidity and overall support to the growing substrate. Combining foam and earth materials in a homogenous manner is described in the commonly assigned U.S. patent application Ser. No. 11/776, 105, supra.

Sample area 314 exemplifies schematically how the combination of earth materials in the synthetic foam material creates an advantageous growing environment for vegetation 324. As illustrated in FIG. 3, sample area 314 includes nutrients 316, filler 318, moisture 320, an air pocket 322 and vegetation 324 in the form of a starter plant with roots. As illustrated, the air pocket 322 provides a relatively large area for the roots from vegetation 324 to enter and grow over time. It is contemplated that the roots will find other nearby air pockets over time and grow similarly into these areas as well. In addition to the air, these roots will have access to nutrients 316 and moisture 320 trapped in the open-celled structure of the foam thus promoting long-term growth. Filler materials 318 such as Peat moss, tree bark, coconut fiber, silica's, soil, most any organic or non-organic substances, placed into the mixture may be used to limit the amount of water the growing media layer 310 may take on and thus also limit the overall saturated weight. This novel combination of materials serves to provide a balanced growing environment for vegetation while serving environmental functions of filtering impurities and pathogens from storm water. This improves the use of such water for gray water irrigation while simultaneously reducing the likelihood of large storm water runoff causing floods.

On the bottom, barrier layer 312 is similar in many respects to the protective layer 308. This barrier layer 312 may also be formed from organic materials such as coconut fibers as well as synthetic materials. The barrier layer 312 serves as a filter for storm water and also promotes water retention within the growing panel system. In certain circumstances, it is also advantageous for the barrier layer 312 to serve as a barrier to root growth and may perform root pruning One type of synthetic cloth material that may be used for the barrier layer 312 includes a copper coating option to inhibit root growth and is manufactured by Texel of Canada, www.texel.ca under the trade name, "TEX-R".

Figure 4A:
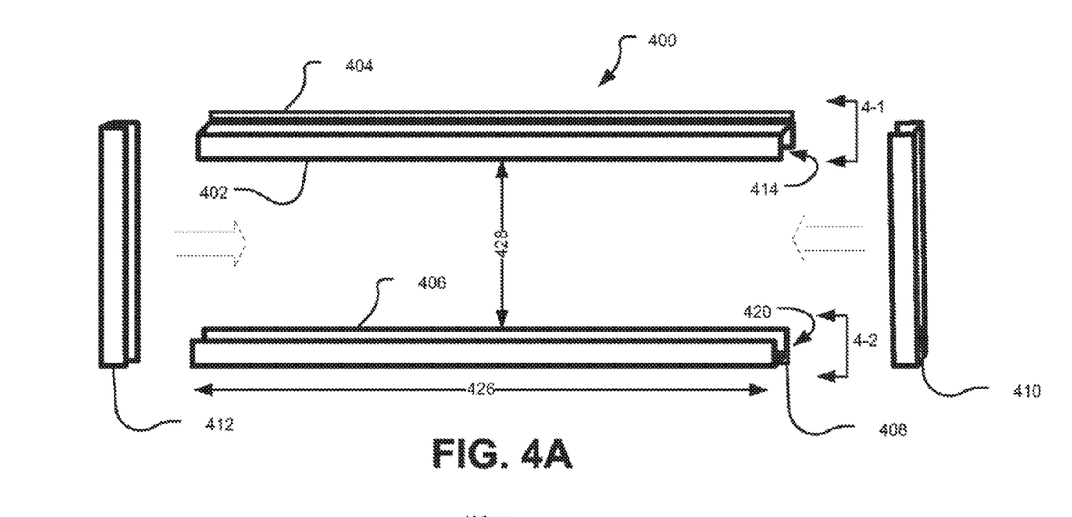
FIGS. 4A-4B illustrate a framework in accordance with some implementations of the present invention for holding and attaching one or more tiles of the growing substrate to a structure such as a residential or commercial building.
Figure 4B:
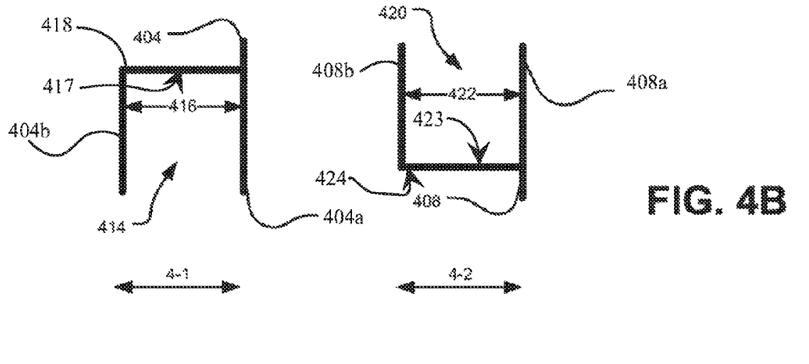

FIGS. 4A-4B illustrate a framework for holding and attaching one or more tiles of the growing substrate to a structure such as a residential or commercial building. Framework 400 is useful in situations where the one or more tiles of the growing substrate cannot be directly attached to the surface of the structure. For example, the framework 400 may slidably receive and hold one or more tiles of the growing substrate in a vertical position against a wall or at a particular angle on the roof of the structure. Depending on the application, framework 400 may be constructed from lightweight plastic materials, wood, aluminum or other metals as required by the particular application and cost structure.

In accordance with some implementations, framework 400 includes an upper channel 402 and a lower channel 406 combined with an optional right channel lock 410 and left channel lock 412. As illustrated in framework 400, upper channel 402 portion of framework 400 has an upper flange 404 and a slot 414. Slot 414 is formed from a flat rectangular elongated plane with a length corresponding to a width of the tile and having an inner surface 417, an outer surface 418, two open ends at opposite sides of the elongated plane, two opposite long edges extending the length of the elongated plane, and two flanges 404a and 404b formed along an entire length of each long edge, the first flanges extending in a same direction at an approximate ninety degree angle from the inner surface at each long edge, thereby creating a slot 414. Width 416 of slot 414 corresponds to the depth of the tile as further illustrated by enlarged side view in FIG. 4B along line 4-1. Similarly, lower channel 406 portion of framework 400 has a lower flange 408 and a slot 420. Slot 420 is formed in a same manner as slot 414, having an inner surface 423, an outer surface 424, two open ends at opposite sides of an elongated plane, two opposite long edges extending the length of the elongated plane, and two flanges 408a and 408b formed along an entire length of each long edge, the first flanges extending in a same direction at an approximate ninety degree angle from the inner surface 423 at each long edge, thereby creating a slot 420. Width 422 of slot 420 also corresponds to the depth of the tile as further illustrated by enlarged side view inside in FIG. 4B along line 4-2 in an enlarged side view.

Generally, the upper channel 402 is aligned in parallel to the lower channel 406 and separated by distance 428 that corresponds to the height of a tile of the growing substrate (not shown). Accordingly, the upper channel 402 and lower channel 406 are disposed to slidably receive one or more tiles along the slot 414 in the upper channel and the slot 420 in the lower channel. Framework 400 may optionally be closed around the one or more tiles by affixing right channel lock 410 or left channel lock 412, or both to upper channel 402 and lower channel 406 as indicated by the respective arrows in FIG. 4A. For example, right channel lock 410 and left channel lock 412 may be attached using rivets, welds, adhesives, removable locking pins or any other suitable method of attachment.

Upper flange 404 and lower flange 408 are used to attach framework 400 to a structure by way of a molding (not shown) attached to the structure. Further details on the molding and attachment of framework 400 are described later herein. In one implementation, the upper flange 404 extends opposite the opening of slot 414 on the upper channel 402 as illustrated along line 4-1. Similarly, the lower flange 408 extends opposite the opening of slot 420 on the lower channel 406 as illustrated in the side view along line 4-2 in FIG. 4B. In an alternate implementation, it is also contemplated that the upper flange 404a and lower flange 408a could also be used to attach framework 400 to a structure vis a vis the molding.

Figure 5A:
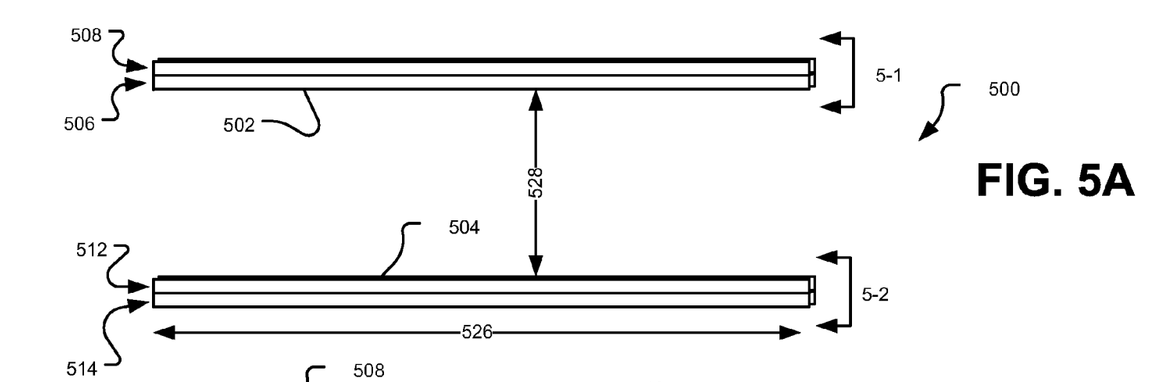
FIGS. 5A-5B illustrate a pair of moldings to be affixed to the surface of the structure and facilitate attachment of a framework with tiles in accordance with some implementations of the present invention.
Figure 5B:
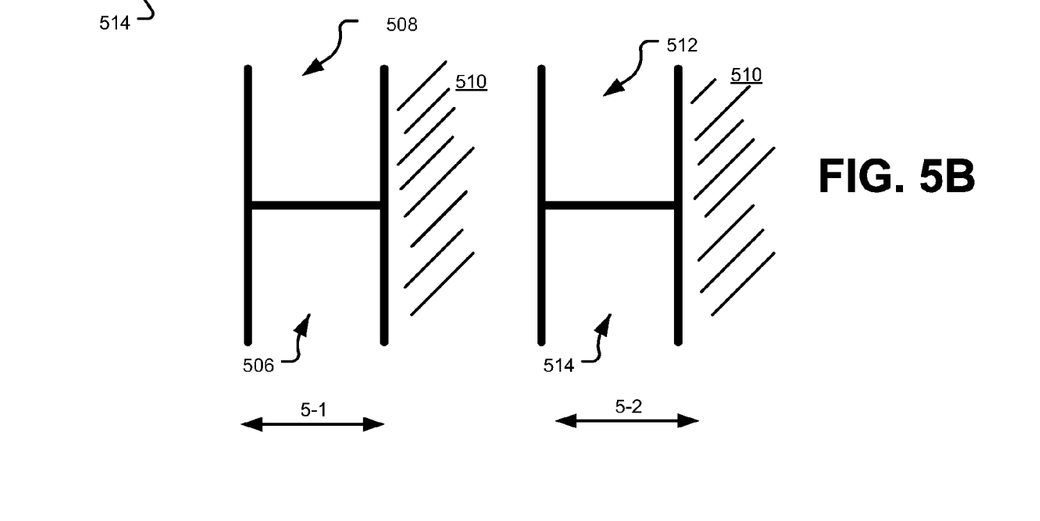

FIGS. 5A-5B illustrate a pair of moldings 500 to be affixed to the surface of the structure and facilitate attachment of a framework with tiles in accordance with the present invention. Molding may be used in situations where a framework of tiles (not shown) needs to be firmly attached or affixed to the surface of a structure For example, the framework may be affixed to the surface of a structure being held in an upright or vertical position as well as in an angled position to the structure. Moldings 500 should be of a sturdy construction and can be formed from a variety of plastics, metals, composites or other materials as suitable for the particular application Accordingly, some implementations include an upper molding 502 having an upper groove 508 and a lower groove 506 as well as a lower molding 504 having a upper groove 512 and lower groove 514. Generally, the upper molding 502 is aligned in parallel to the lower molding 506 and separated by distance 528 corresponding to the height of a framework holding tiles of a growing substrate of the present invention. Both upper molding 502 and lower molding 504 are affixed to a surface 510 of the structure as indicated by side view in FIG. 5B along lines 5-1 and 5-2 respectively. For example, upper molding 502 and lower molding 504 may be affixed horizontally using steel bolts inserted into a wall of a structure. In contrast, a roof installation may recommend a permanent adhesive material to attach upper molding 502 and lower molding 504 to the roofing surface so as not to breach the water resistant qualities of the roof.

Once attached to the structure, at least one groove in upper molding 502 is disposed to receive the upper flange of the framework (not shown). For example, upper flange 404 in upper channel 402 of framework 400 in FIG. 4A may be slidably attached the lower groove 506 in upper molding 502. Likewise, at least one groove in lower molding 504 slidably receives the lower flange of the framework (not shown). For example, lower flange 408 in lower channel 406 of framework 400 may be slidably attached to the upper groove 512 in lower molding 504. As will be described in further detail later herein, upper molding 502 and lower molding 504 include upper and lower grooves in order to facilitate stacking of multiple growing panel systems of the present invention.

Figure 6A:
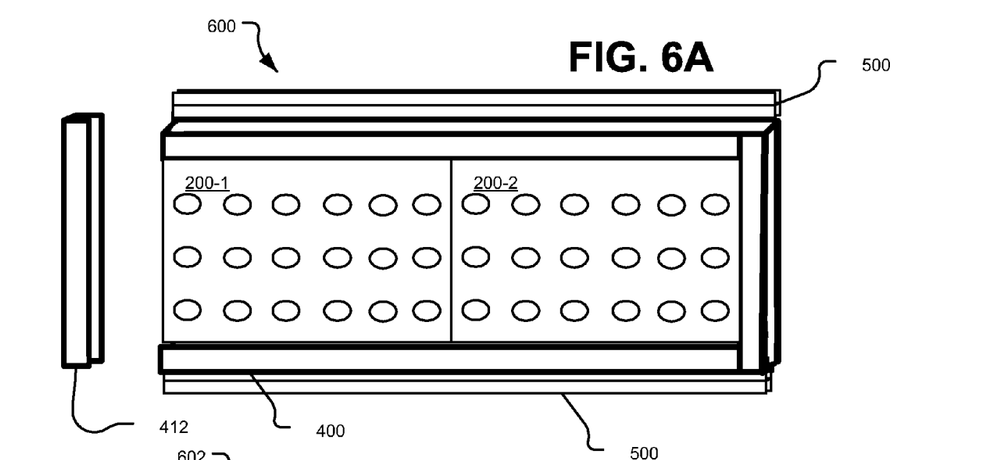
FIG. 6A illustrates a single modular growing panel system attached to a surface of a structure in accordance with some implementations of the present invention.

FIG. 6A illustrates a single modular growing panel system 600 attached to a surface of a structure in accordance with some implementations of the present invention. In this example, a growing substrate designed in accordance with the present invention is formed into tile 200-1 and tile 200-1 and then slidably inserted into a framework 400. As previously described, a left channel lock 412 portion of framework 400 be used to enclose tiles 200-1 and 200-1 within framework 400. Upper and lower flanges of framework 400 are then slidably inserted into the upper and lower grooves of a pair of moldings 500 attached to the surface of the structure. Because the tiles from the created from the growing substrate are rigid and need little support, a substantial area of the weather protective layer remains uncovered by the framework and available to receive a plurality of the starter vegetation.

Figure 6B:
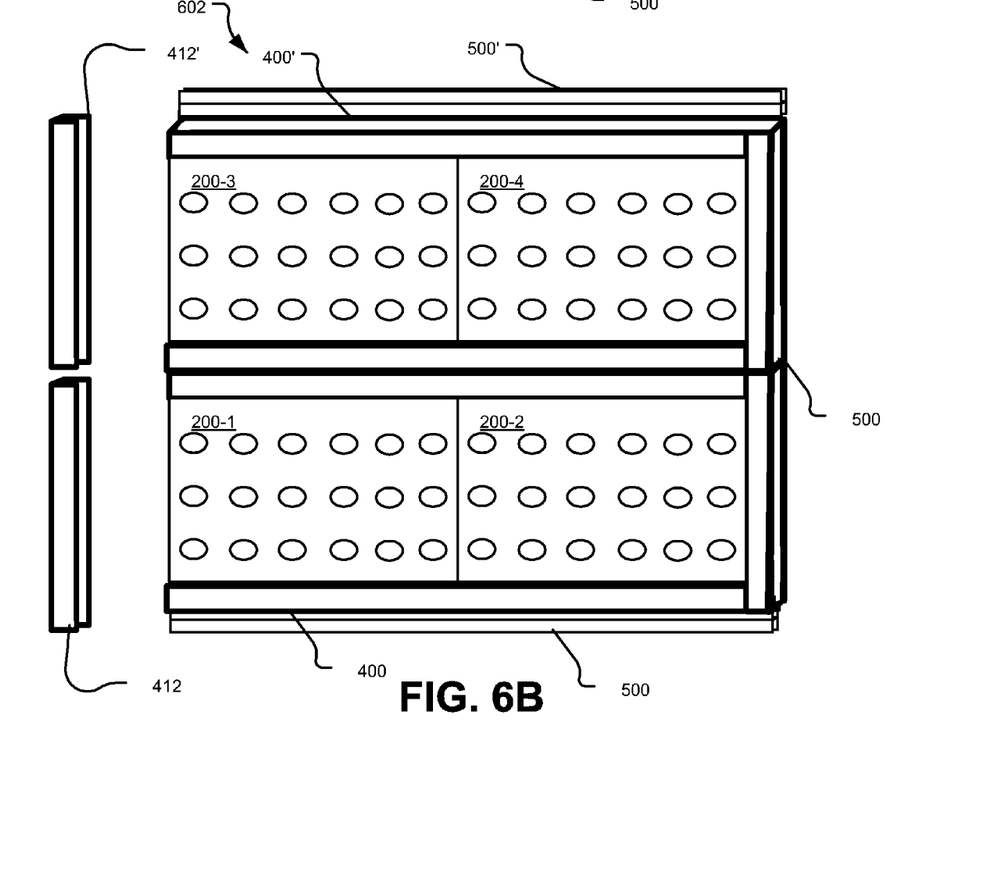
FIG. 6B illustrates a stacked modular growing panel system attached to the surface of a structure in accordance with some implementations of the present invention.

Likewise, FIG. 6B illustrates a stacked modular growing panel system 602 attached to the surface of a structure in accordance with some implementations of the present invention. Instead of two (2) tiles, a growing substrate designed in accordance with the present invention is formed into four (4) tiles identified as tile 200-1, tile 200-2, tile 200-3 and tile 200-4. A first pair of the tiles 200-1 and 200-2 are assembled into framework 400 held in place using left channel lock 412 as described above in FIG. 6A. Framework 400 is slidably inserted into the grooves of the pair of moldings 500 as described above with respect to FIG. 6A. Next, a second pair of tiles 200-3 and 200-4 are assembled into an additional framework 400' and held in place with a left channel lock 412' in a similar manner as described in FIG. 6A. Instead of using a pair of moldings, a single molding 500' is additionally attached to the surface of the structure and slidably receives the upper flange of framework 400'. Because the frameworks are stacked, the lower flange of framework 400' is slidably attached to the upper groove of the upper molding from the pair of moldings 500 already attached to the surface of the structure.

Figure 7:
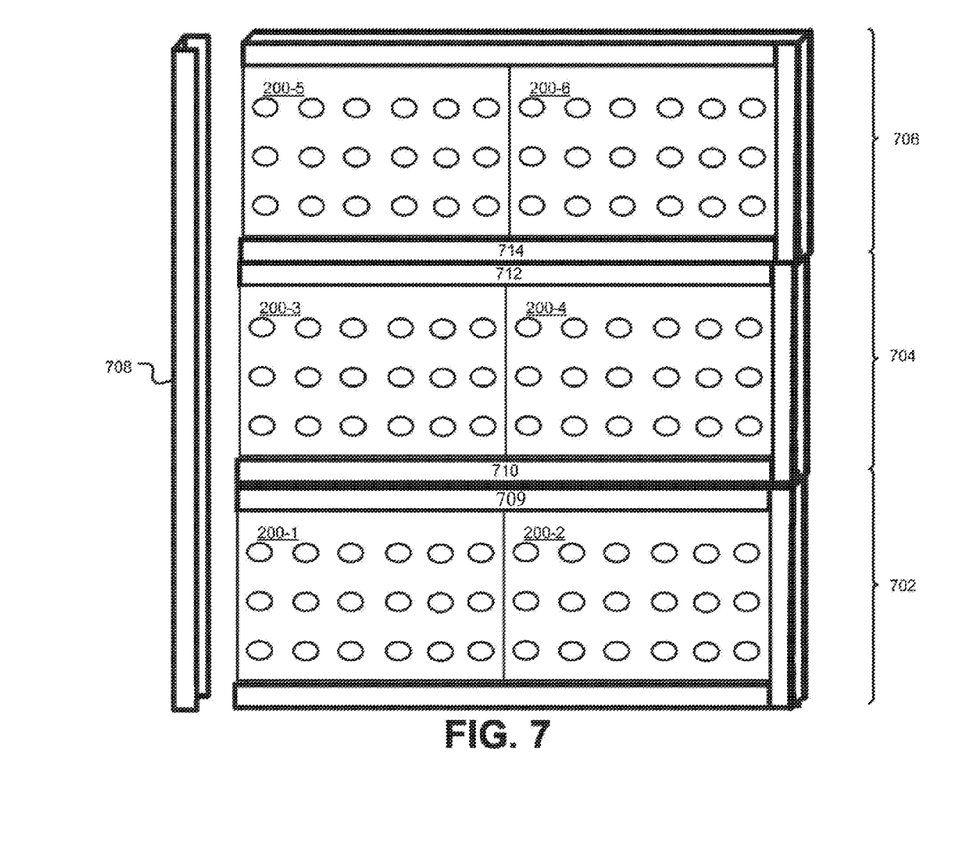
FIG. 7 illustrates a stacked modular growing panel system that may placed on a flat surface, such as a flat roof, and not attached with moldings in accordance with some implementations of the present invention.

FIG. 7 illustrates a stacked modular growing panel system 700 that may placed on a flat surface, such as a flat roof, and not attached with moldings. In this example, a growing substrate designed in accordance with the present invention is formed into six (6) tiles identified as tile 200-1, tile 200-2, tile 200-3, tile 200-4, tiles 200-5 and tiles 200-6. A first pair of the tiles 200-1 and 200-2 are slidably inserted into framework 702 much like framework 400 in FIG. 6A except that the framework 702 does not have an upper flange or a lower flange. Next, a second pair of tiles 200-3 and 200-4 are slidably inserted into an additional framework 704 in much the same manner as framework 702. A last pair of tiles 200-5 and 200-6 are slidably inserted into a third additional framework 706 again in much the same manner as framework 400 in FIG. 6A. To create the stacked modular growing panel system 700, a lower channel 710 from framework 704 can be secured to an upper channel 709 from framework 702. Likewise, a lower channel 714 from framework 706 is secured to an upper channel 712 from framework 704. A single left channel lock 708 may then be used to lock tiles 200-1, 200-2, 200-3, 200-4, 200-5 and 200-6 into the stacked modular growing system 700 of the present invention. In accordance with some implementations, rivets, adhesives, welds, screws, or bolts may be used to secure frameworks 702, 704, and 706 together.

Figure 8:
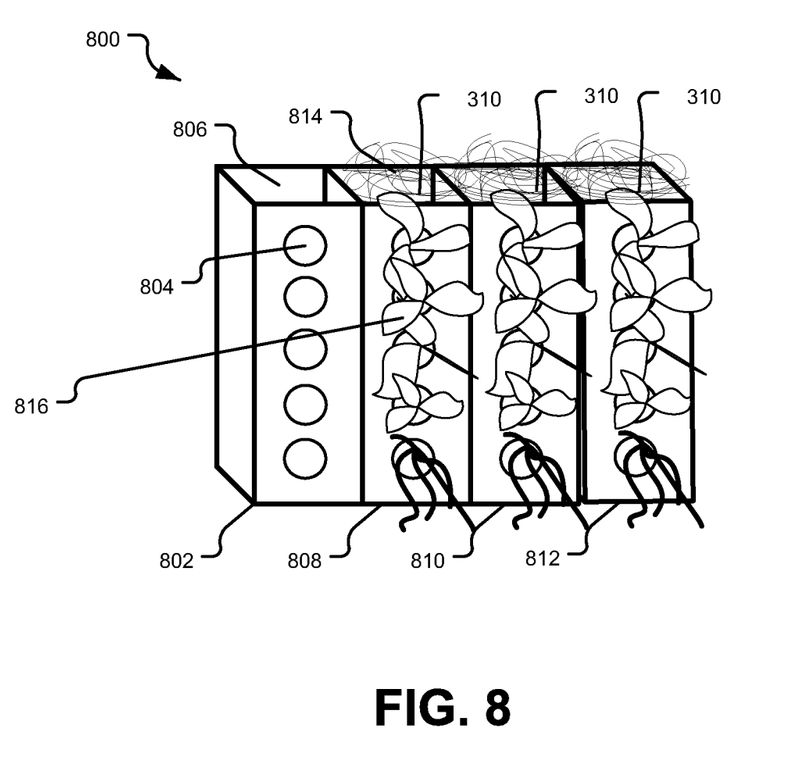
FIG. 8 illustrates an alternative implementation of the present invention in the form of a modular growing wall system.

FIG. 8 illustrates an alternative implementation of the present invention in the form of a modular growing wall system. This growing wall system provides aesthetic appeal through the growing of vegetation such as plants, succulents, grasses and the like while also delivering sound absorption, water maintenance and control and security. Modular growing wall system 800 may be formed from a series of wall modules 802, 808, 810 and 812. The wall modules each may be made from a sturdy UV resistant plastic material or lightweight metal or alloy. For example, wall module 802 illustrates an empty wall module having a series of insertion areas 804 for insertion of vegetation such as plants. Opening 806 in wall module 802 provides a wide opening for the pouring of a growing medium layer 310 as described previously in conjunction with FIG. 3. Since growing medium layer 310 supports growth of vegetation but may not block UV radiation, protective layer 814 is provided that operates much like the protective layer 308 also described in FIG. 3. For example, protective layer 814 maybe used to cover growing medium layer 310 filled in wall modules 808, 810 and 812 in FIG. 8. Exemplary vegetation 816 maybe urged into place through insertion 804 areas using a tool after growing medium layer and thus with drip or natural irrigation will grow despite inclement weather, excessive rain and wind. Application of modular growing wall system of the present invention 800 would likely be beneficial in freeways, highways, large estates and other areas where noise control, privacy, water management and low maintenance promotion of vegetation is desired.

While specific embodiments have been described herein for purposes of illustration, various modifications may be made without departing from the spirit and scope of the invention. Accordingly, the invention is not limited to the above-described implementations, but instead is defined by the appended claims in light of their full scope of equivalents.

What is claimed is:

1. A modular growing panel system for attaching vegetation to a surface, comprising:
    a growing substrate formed into a tile that is rigid and self-supportive of vegetation being grown in the growing substrate, wherein the growing substrate includes a growing media layer formed by homogenously mixing earth materials and plant nutrients distributed through a foam binding material that cures and creates air pockets to receive the root of the starter plant, retain air, moisture and nutrients and thereby provide a growing environment for a plant; and
    a framework for holding and attaching one or more tiles to the surface comprising:
        an upper channel formed from a flat rectangular elongated plane with a length corresponding to a width of the tile and having an inner surface, an outer surface, two short edges at opposite sides of the elongated plane, two long edges extending the length of the elongated plane, and two first flanges formed along an entire length of each long edge, the first flanges extending in a same direction at an approximate ninety degree angle from the inner surface at each edge, and having a width corresponding to a depth of the tile, thereby creating a first slot having first open opposite ends formed at the two short edges; and
        a lower channel, substantially mirroring the upper channel having a second slot formed by second flanges also corresponding to the depth of the tile and two second open ends;
        a third flange extending in an opposite direction of the first and second flanges along the entire length of the outer surface of each channel at one of the long edges, at substantially 90 degrees from the outer surface;
    wherein the upper channel is aligned in parallel to the lower channel separated by a distance corresponding to a width of the tile, the first and second flanges extending towards each other and the tile is enabled to slide into the first and second slots via the open ends and one of the first and second flanges of the first and second slots are attached to the surface via the third flange.

2. The modular system of claim 1, further comprising a plurality of layers in the tile, wherein at least one of the plurality of layers includes a rigid grid creating additional rigidity in the growing substrate and further supportive of the growing substrate and plants growing therein.

3. The modular system of claim 1, further comprising a plurality of layers in addition to the growing substrate including a protective layer on the top that resists breakdown from ultra-violet (UV) radiation and erosion due to wind and other forces while promoting moisture retention in lower layers and disposed to receive a starter plant and root through an insertion area in the protective layer, the growing media layer below the protective layer wherein the growing media layer is formed with a homogenous mixture of earth materials and plant nutrients distributed through the foam binding material that cures creating air pockets that receives the root of the starter plant and retains air, moisture and nutrients and a barrier layer below the growing media layer that provides a root barrier to reduce the growth of roots below the barrier layer and acts as a filter for water passing through the growing substrate.

4. The modular system of claim 3 wherein the foam binding material in the growing media layer stabilizes the earth materials and plant nutrients while also providing rigidity and overall support to the growing substrate.

5. The modular system of claim 3 wherein a substantial area of the protective layer remains uncovered by the framework and available to receive a plurality of the starter vegetation.

6. The modular system of claim 1, wherein a plurality of tiles are placed into a single framework.

7. The modular system of claim 1 wherein the framework is attached to the surface via one or more moldings affixed to the surface having a groove enabled to accept the length of the third flange.

8. The modular system of claim 7 wherein, the moldings have a second groove formed at an opposite side from a first groove and a plurality of frameworks are mounted to the surface adjacent to each other by arranging the moldings in parallel providing a distance between each molding corresponding to a width of the framework in a manner wherein after the third flanges are inserted in the grooves of the moldings, a third flange of an additional framework, identical to the framework, is inserted at the second groove of the moldings causing the outer surface of the upper channel of the framework to be adjacent to an outer surface of a lower channel of the additional framework.

9. The modular system of claim 8, wherein a first channel lock is used to cover and secure the open ends of both the framework and additional framework one side and a second channel lock is used to cover and secure open ends of both the framework and additional framework on an end opposite the one end.

* * * * *